J. A. WHELPLEY.
Skates.
No. 5,955. Reissued June 30, 1874.
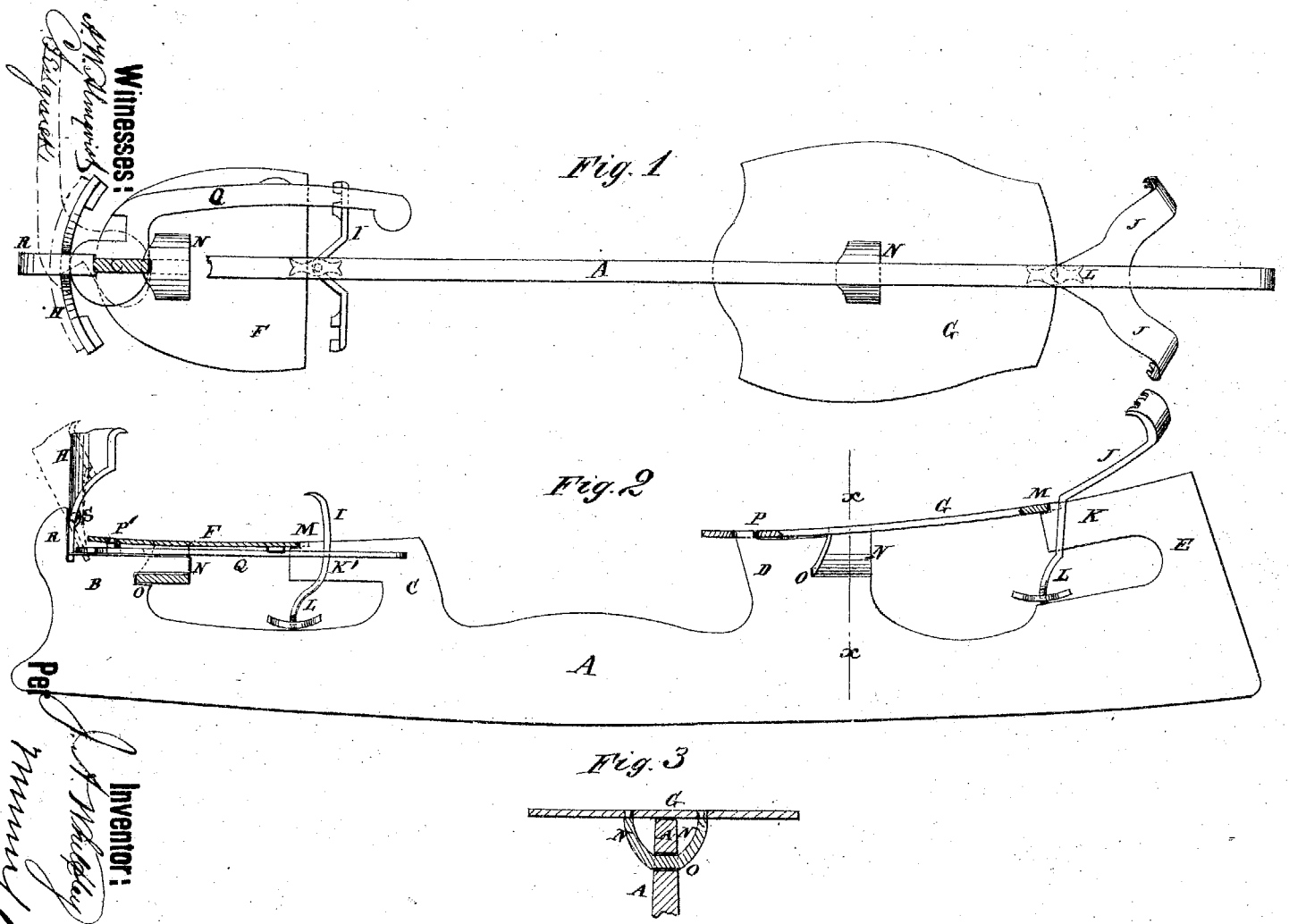
Witnesses:
A. W. Almqvist
C. Seigarski
Inventor:
J. A. Whelpley
Per
Attorneys.
AM. PHOTO-LITHOGRAPHIC Co. N. Y. (OSBORNE'S PROCESS.)

UNITED STATES PATENT OFFICE.

JAMES A. WHELPLEY, OF DARTMOUTH, NOVA SCOTIA.

IMPROVEMENT IN SKATES.

Specification forming part of Letters Patent No. 144,718, dated November 18, 1873; reissue No. 5,955, dated June 30, 1874; application filed January 10, 1874.

*To all whom it may concern:*

Be it known that I, JAMES ALBERT WHELPLEY, of Dartmouth, in the county of Halifax, in Nova Scotia, have invented a new and Improved Skate, of which the following is a specification:

The invention will first be fully described, and then pointed out in the claims.

Figure 1 is a plan of the bottom of my improved skate. Fig. 2 is a side elevation. Fig. 3 is a cross-section on line *x x* of Fig. 2.

Similar letters of reference indicate corresponding parts.

A represents the runner, which has the standards B, C, D, and E formed together with it, and projecting upward from the upper edge for the support of the heel-plate F, sole-plate G, the heel-clamps H and I, and the toe-clamp J. The standards C and E have long projections K K′ parallel with the upper edge of the plate for the support of the front ends of the sole-plates, and the clamps for the toe and the front of the heel, which it is designed to make adjustable forward and backward to suit different boots or shoes. In this example said clamps are mortised to fit nicely on said projections, but so as to shift freely, and at the same time to bind and hold fast anywhere by cramping, when, after being adjusted against the boot, the latter is forced forward a little on the skate against the upper ends of the clamps. Thus they are adapted to be self-fastening, and not only allow of dispensing with any other special fastening, but they also simplify the fastening and unfastening of the skate and boot; but, in addition thereto, they extend down to the upper edge of the blade of the skate, and have thereat a thumb-nut, L, screwed on the lower extremity, so as to further cramp and bind them fast by screwing down on the runner. A binding-screw might be readily applied to the extensions of the clamps to act directly on the projections K K′, or a binding-screw and nut in a slot in the projections and in front of the clamps would effect the same object as equivalents of the nuts L. These projections are also notched slightly at M to receive the sole-plate and heel-plate, which are also notched a little to receive the projections, and lock together with them when said plates are connected to the runner. Said plates have a strong semicircular brace, N, permanently attached to the under side, as shown, and these braces are engaged with the standards B and D by entering the longitudinal notches O when the plates are placed on, sprung down, and moved endwise. At the same time the notches of the plates and the projections lock together at M. Standards B and D also have a projection, P′, entering a groove or socket or passing entirely through the plates, to secure them against lateral movement, and to hold them forward in the notches at M. The plates are firmly and securely fastened on the skate by the binding effect produced by thus springing them down into the notches M, and onto the projections P′, so as to need no other fastening, and so that they can be taken off at any time merely by springing them up out of notches M, and sliding them forward to disconnect the braces from slots O.

I prefer to have projections P′ merely enter grooves or sockets in the plates instead of passing through. In the case of the standard B this projection P′ is also the pivot for the cam-lever Q, which is employed to fasten the heel-clamp H against the boot. Said clamp H is pivoted on a stud, S, projecting from the heel-piece R of the runner, which extends up behind the heel of the boot, so as to allow the clamp to swing forward and back, and to fasten and unfasten the skates. This heel-piece R may itself be the fastening, if desired.

The eccentric lever is secured by the catch T on the under side of the plate, over which said lever springs.

It will be seen that all the several parts of the skate can be cut or formed in the shapes required by the dies by which they are punched out of the plates of which they are formed, and that the only fitting necessary, besides the smoothing and polishing, is a little bending of the clamps, the fitting of the nuts L, and the fastening of the braces N to the plates.

Having thus described my invention, I claim as new and desire to secure by Letters Patent—

1. The skate-runner, having horns or projections K K′ in advance of the sole and heel plates, for attaching the front heel and toe-clamps independently of the sole and heel plates, substantially as specified.

2. The combination of heel-clamp H, standard P, and lever Q, arranged as shown and described, whereby the standard is used as the pivot of the lever, and the clamp is fastened, substantially as specified.

3. A hand-nut L, placed on the lower end of the adjustable clamps, and arranged to fasten them by screwing against the runner, in the manner described.

4. The semicircular brace N, held in a slot, O, in the runner, and made fast to the sole or heel plate, as and for the purpose specified.

5. The sole and heel plates, fastened detachably to the runner by springing into connection with the notches M, slots O, and projections P, substantially as specified.

6. A vibrating heel-piece, H, clamped by means of a pendent shank and a cam-lever, substantially as specified.

7. A lever, Q, having a slot and a projecting point, in combination with the shank of the heel-piece, provided with an incline, to operate as and for the purpose set forth.

JAMES ALBERT WHELPLEY.

Witnesses:
A. P. THAYER,
T. B. MOSHER.